United States Patent [19]

Kuwabara et al.

[11] 4,375,481

[45] Mar. 1, 1983

[54] PROCESS FOR PRODUCTION OF ROE-LIKE MULTILAYER SPHERICAL STRUCTURE

[75] Inventors: Kiyoaki Kuwabara; Masanori Jyouraku, both of Uozu, Japan

[73] Assignee: Nippon Carbide Kogyo Kabushiki Kaisha, Tokyo, Japan

[21] Appl. No.: 170,286

[22] Filed: Jul. 18, 1980

[51] Int. Cl.³ .............................. A23L 1/04; A23J 3/00
[52] U.S. Cl. ...................................... 426/93; 426/104; 426/573; 426/575; 426/576; 426/577; 426/658; 426/802
[58] Field of Search ................... 426/93, 98, 103, 104, 426/573, 575, 576, 577, 658, 802

[56] References Cited

U.S. PATENT DOCUMENTS

| | | | |
|---|---|---|---|
| 3,717,469 | 2/1973 | Slonimsky | 426/658 |
| 4,202,908 | 5/1980 | Nesmeyanor et al. | 426/575 |

FOREIGN PATENT DOCUMENTS

| | | | |
|---|---|---|---|
| 45-18509 | 1/1970 | Japan | 426/103 |
| 46-21772 | 6/1971 | Japan | 426/576 |
| 51-79755 | 7/1976 | Japan | 426/103 |
| 52-59079 | 5/1977 | Japan | 426/103 |
| 53-26374 | 3/1978 | Japan | 426/516 |
| 53-13697 | 5/1978 | Japan | 426/103 |
| 53-31933 | 9/1978 | Japan | 426/98 |
| 53-39193 | 10/1978 | Japan | 426/98 |
| 54-110352 | 8/1979 | Japan | 426/104 |

*Primary Examiner*—Jeanette M. Hunter
*Attorney, Agent, or Firm*—Sherman & Shalloway

[57] ABSTRACT

In a process for producing an edible roe-like multilayer spherical structure composed of at least two layers including an inner layer and an outer layer occluding the inner layer, which comprises a step of synchronously discharging at least two edible materials through a multi-tubular nozzle having at least two different passages including an inner passage and an outer passage surrounding the inner passage and a step of chemically gelling the resulting multilayer spherical structure with a metal ion acceptable for human intake, the outer layer in said resulting multilayer spherical structure being chemically gellable with said metal ion; the improvement wherein (i) said at least two edible materials are at least two edible aqueous sol materials having different properties of being chemically gelled with said metal ion, and

(ii) among said edible aqueous sol materials, a material forming the inner layer is convertible to a softer aqueous gel than a material forming the outer layer or is present as an aqueous sol.

4 Claims, 12 Drawing Figures

PROCESS FOR PRODUCTION OF ROE-LIKE MULTILAYER SPHERICAL STRUCTURE

This invention relates to a process for producing an edible roe-like multilayer spherical structure composed of at least two layers including an inner layer and an outer layer occluding the inner layer. This structure is useful as foods, feeds and the like because of their various improvements in texture, water-holding property, shape retention, strength, waterproofness, transparency, palatability, and invariability in taste with temperature change. In particular, the process of this invention makes it possible to produce the aforesaid multilayer spherical structure in one step with good efficiency and quality reproducibility by an easy operation in a simple device.

Various processes have been suggested in the past for the production of a roe-like multilayer spherical structure composed of at least two layers including an inner layer and an outer layer occluding the inner layer. These processes for production of artificial roe having a multilayer spherical structure can be classified into the following two types.

One type is based on a multistep process which comprises preparing a single layer particulate material of a gellable sol material, gelling the particulate material, and separately forming thereon an additional layer covering the particulate material, thereby forming a multilayer spherical structure. Processes of this type are described, for example, in Japanese Patent Publications Nos. 21772/71, 18509/76, 13697/78 and 31933/78 and Japanese Laid-Open Patent Publication No. 26374/78.

In this type of process, the multilayer spherical structure cannot be formed in one step, but a multiplicity of steps are required. In addition to this disadvantage in operation and apparatus, much expertise and care are required in controlling the step of gelling the single layer particulate material because this gelling step subtly affects the quality of the final product. Moreover, even with the use of such an operation which requires expertise and careful attention, the reproducibility of the quality of the product is poor and the efficiency of production is naturally reduced. The quality of the final product is unsatisfactory, and the artificial roe obtained by this type of process is not pleasing to the palate because it does not show a favorable texture inherent to natural roe.

Other type is a multistep process for producing a multilayer spherical structure, which comprises discharging synchronously an oily substance through an inner passage of a double-tubular nozzle and a gellable sol material through an outer passage thereof to form a two-layer spherical structure, and separately forming an additional outer layer on the outside of the two-layer spherical structure. Processes of this type are disclosed, for example, in Japanese Laid-Open Patent Publication Nos. 79755/76, 59079/77 and 110352/79.

The processes using the double-tubular nozzle, especially the process disclosed in the last-mentioned Patent Publication, include a step of synchronously discharging an oily substance through an inner passage of the double-tubular nozzle and an edible sol material capable of being chemically gelled by a metal ion acceptable for human intake through an outer passage of the nozzle, and a step of chemically gelling with the aforesaid metal ion the resulting two-layer spherical structure in which the outer layer is chemically gellable with the aforesaid metal ion.

In this type of process, in order to provide a multilayer structure around the central core of the oily substance, it is necessary to first gel the outer layer of the resulting two-layer spherical structure and then form an additional outer layer on the resulting structure by the same technique as in the first-mentioned type. Accordingly, this type of process cannot be free from the defect of requiring a multistep process in order to provide a multilayer structure around the central oily substance. The process still suffers from troubles in regard to the control of the quality of the product and the reproducibility of its quality, and the efficiency of production is unsatisfactory.

The aforesaid conventional processes for production of an edible roe-like multilayer spherical structure composed of at least two layers including an inner layer and an outer layer occluding the inner layer are based on the common technical idea that to provide a structure composed of at least two outer layers around the inner layer of oily substance, these outer layers should be formed by separate steps. It appears that those people who suggested these prior processes commonly thought that if these outer layers are formed in one step, it would be difficult to control the quality of the final product and it would be impossible to provide satisfactory structures which have various organoleptic properties such as texture and palatability inherent to roe. In fact, however, according to these prior suggestions, satisfactory products are difficult to provide by the aforesaid step-by-step processes.

For example, in the latter-mentioned type of process involving using a double-tubular nozzle, in order to provide a structure composed of at least two outer layers around the inner layer of oily substance, the outer layer should be gelled to such an extent that an operation of forming an additional outer layer can be performed. Otherwise, the transfer of the intermediate product to the step of forming the additional outer layer and the operation of forming the additional outer layer would be difficult. Consequently, the outer layer will be gelled to an unduly hard mass, and the resulting multilayer spherical structure is far from having the favorable texture and palatability of natural roe. To avoid this difficulty, it may be possible to first gel the inner layer at low temperature (physical gellation) without subjecting it to chemical gellation, and then form an additional outer layer on the inner layer so gelled. But low-temperature gellation is difficult to perform in water, and it is generally necessary to perform low-temperature gellation in an oil. As a result of gellation in an oil, it is extremely difficult to remove the oil adhering to the particles of the resulting inner layer. Since an aqueous sol is difficult to coat on the oil-adhering part of the inner layer, the particles of the inner layer is only incompletely coated. Moreover, many of the particles will be broken, and the resulting product is of very poor quality.

Japanese Patent Publication No. 39193/78 discloses a process for producing a multilayer spherical structure having a core portion of an oil-like or oily material and an outer layer occluding the core, although the purpose of this process is not the production of roe-like particles having a multilayer structure. This process comprises discharging synchronously an oil-like or oily unclear material through a central passage of a triple-tubular nozzle, an emulsion of a material forming an inner layer of a capsule through a passage enclosing the central passage, and a material for forming an outer layer of the capsule through an outermost passage of the nozzle into a cooling liquid, and gelling the resulting structure at the cooling temperature (physical gellation). According to this suggested process, it is important that the material for forming the inner layer of the capsule should be an emulsion composed of an oil and a gelatin solution or a polymer. It is stated in the above Patent Publication that the proportion of the oil in the emulsion should be within the range of 5 to 50%. The Patent Publication discloses the use of an emulsion composed of gelatin, a purified vegetable oil, D-sorbitol and water, and does not at all refer to aqueous sol materials. In addition, this prior Patent Publication describes the use of a sol obtained by dissolving gelatin and D-sorbitol in water at 80° C. as a material for forming the outer layer of the capsule. It is practically impossible however to produce artificial roe by using the technique disclosed in this Patent Publication. Because of the emulsion layer and the temperature-dependent gelling means which are essential in this process, the transparency inherent to natural roe cannot be obtained, and the product gives off an oily smell. The water-holding property of the product is also poor because the use of an emulsifier is essential. Furthermore, since the aforesaid structure is produced only by the temperature-dependent gelling means, the texture of the product varies undesirably with temperature, and therefore, such a product cannot be used as an artificial roe.

The present inventors have extensively worked to overcome the aforesaid defects of the prior art, and arrived at the present invention on the basis of quite a contrary idea to the prior art. It has been found by the present inventors that an artificial roe having favorable texture, water-holding property, shape retention, strength, water-proofness, transparency, taste and invariable palatability with temperature change resembling those of natural roe can be obtained advantageously on a commercial scale with an excellent production efficiency and an excellent reproducibility of quality by a process which meets a combination of the following parameters.

(1) A multilayer spherical structure as a final product is formed in one step by using a multi-tubular nozzle while obviating the necessity of separately forming an additional outer layer or layers, contrary to the prior art processes which involve a multiplicity of steps to form a multilayer structure around an inner layer of an oily substance.

(2) A multilayer structure is formed around an inner layer of an oily substance is formed by using at least two kinds of edible aqueous sol materials having different properties of being gelled chemically by a metal ion acceptable for human intake, and at least the outermost layer of the multilayer structure is chemically gelled, contrary to the aforesaid prior process for producing a mononuclear double capsule which essentially requires the use of two kinds of gellable materials which cannot substantially be gelled chemically, namely which have the same property of being chemically gelled and can be gelled physically, the use of an emulsion as a material for forming an inside layer of the multilayer structure and the performance of temperature-dependent gellation (physical gellation), in order to provide a multilayer structure around the central layer of an oily substance.

(3) Among the aforesaid edible aqueous sol materials, a material which forms an inner layer is convertible to a softer aqueous gel than a material forming an outer layer, or is present as an aqueous sol.

It has also been found that since according to the process of this invention, the inner layer can be a softer aqueous gel than the outer layer or can be present as an aqueous sol only by properly selecting conditions for chemical gellation of a multilayer spherical structure discharged from a multi-tubular nozzle, it has the advantage of producing a high-quality edible roe-like multilayer spherical structure composed of at least two layers having an inner layer and an outer layer occluding the inner layer in one step with a good reproducibility of quality without any likelihood of causing imperfections to these layers.

It has also been found that according to this invention, an artificial roe (of three-layer structure) similar to a salmon roe which is of relatively complex structure and has a subtle palatability as compared with other roes can be easily produced by one particle-forming operation with a good reproducibility of its quality.

It is an object of this invention therefore to provide an improved process for producing an edible roe-like multilayer spherical structure composed of at least two layers including an inner layer and an outer layer occluding the inner layer, in which these layers are derived from at least two edible aqueous sol materials.

The above and other objects and advantages of this invention will become more apparent from the following description.

The present invention thus provides a process for producing an edible roe-like multilayer spherical structure composed of at least two layers including an inner layer and an outer layer occluding the inner layer, which comprises a step of synchronously discharging at least two edible materials through a multi-tubular nozzle having at least two different passages including an inner passage and an outer passage surrounding the inner passage, and a step of chemically gelling the resulting multilayer spherical structure with a metal ion acceptable for human intake, the outer layer in said multilayer spherical structure being chemically gellable with said metal ion; characterized in that:

(i) said at least two edible materials are at least two edible aqueous sol materials having different properties of being chemically gelled with said metal ion, and (ii) among said edible aqueous sol materials, a material forming the inner layer is convertible to a softer aqueous gel than a material forming the outer layer or is present as an aqueous sol.

The multi-tubular nozzle used in this invention may be of any desired structure by which the edible aqueous sol materials specified in (i) above can be discharged through different passages in the nozzle to form aqueous sol droplets of a multilayer spherical structure. Some embodiments of such a multi-tubular nozzle are shown in FIGS. 1-12 of the accompanying drawings. In each of these figures, the B portion shows an enlarged partial longitudinal sectional view of the discharge end of the nozzle or its vicinity, and the upper portion shows a cross-sectional view of the lower portion taken along the line a—a.

FIGS. 1 to 3 show examples of a double-tubular nozzle, and

FIGS. 5–8 show examples of a triple-tubular nozzle. As shown in these examples, the cross-sectional surface of the discharge end of the nozzle may be on the same level or on a different level.

FIGS. 9 and 11 show examples of a double-tubular nozzle of an irregular shape, and FIGS. 10 and 12 show examples of a triple-tubular nozzle of an irregular shape. In these irregularly-shaped nozzles, too, the cross-sectional surface of the discharge end of the nozzle may be on the same level or on a different level.

Figure 4A:
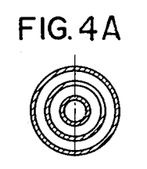
Figure 4B:
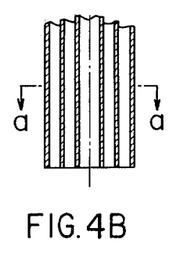
Figure 5A:
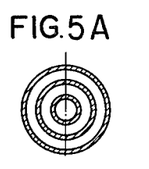
Figure 5B:
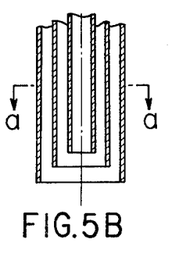
Figure 6A:
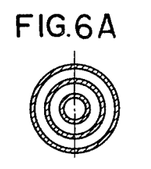
Figure 6B:
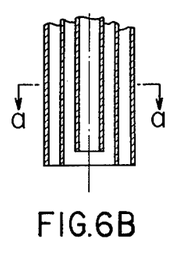
Figure 7A:
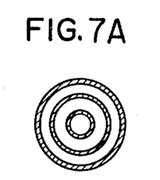
Figure 7B:
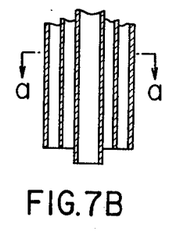
Figure 8A:
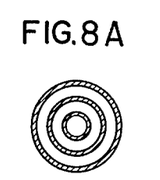
Figure 8B:
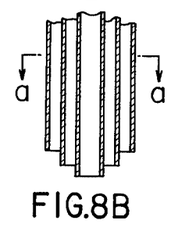
Figure 9A:
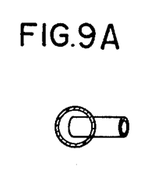
Figure 9B:
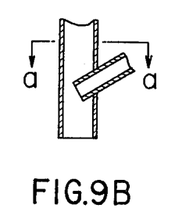
Figure 10A:
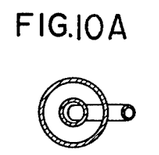
Figure 10B:
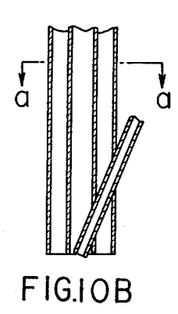
Figure 11A:
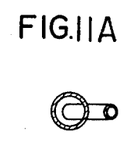
Figure 11B:
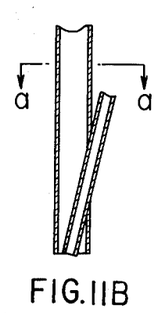
Figure 12A:
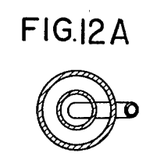
Figure 12B:
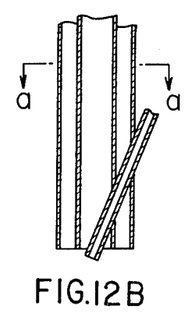

For example, when in FIG. 4 an oily substance is extruded through the innermost passage of the nozzle, and two aqueous sol materials having different properties of being chemically gelled are extruded respectively through the two outside passages, there can be formed sol particles of a three-layer structure consisting of the innermost layer (nucleus) of the oily substance, an aqueous sol layer occluding the innermost layer and another aqueous sol layer occluding the aforesaid aqueous sol layer, in which the first-mentioned aqueous sol material, when subjected to a chemical gelling treatment, will be converted to a softer aqueous gel than the latter-mentioned aqueous sol material or is present as an aqueous sol. By chemically gelling the resulting sol particles with a metal ion acceptable for human intake, for example by releasing the sol particles directly into an aqueous solution containing the aforesaid metal ion, a three-layer spherical structure similar to natural roe, especially salmon roe, can be produced in one step.

Various edible materials capable of forming an aqueous sol can be used as the edible aqueous sol materials having different properties of being chemically gelled by a metal ion acceptable for human intake. Such edible materials are known to those skilled in the art, and can be used either singly or in combination with each other. Examples of these edible and aqueous sol-forming materials include vegetable polysaccharides such as pectin, pectinic acid, locust bean gum, guaran, alginic acid, water-soluble salts or derivatives of alginic acid such as sodium alginate or propylene glycol alginate, konjac flour, agar and carrageenan; vegetable gums such as gum arabic, tragacanth gum, guar gum, xanthan gum and tamarind gum; starches such as kuzu starch, potato starch, wheat starch, dextrin, starch sodium glycolate and starch phosphate sodium salt; proteins such as wheat protein (gluten), soybean protein, corn protein (zein), ovalbumin, milk protein (casein), gelatin and metaprotein; cellulosic materials such as methyl cellulose, carboxy methyl cellulose and cellulose sodium glycolate; and poly (sodium acrylate). These materials may be used as an aqueous sol of each of them singly or a mixture of two or more of them. The use of a mixture of these sometimes serves to improve the various properties of the resulting product, such as strength, water-holding property, water resistance, shape retention and texture. Depending upon the technique of chemical gellation to be employed, these materials can be selected in suitable combinations.

In performing the process of this invention, the concentration of the aforesaid edible aqueous sol-forming material may be properly selected. For example, it is preferably about 0.01 to about 50% by weight, more preferably about 0.1 to about 30% by weight, based on the weight of the aqueous sol solution.

If desired, additives may be incorporated in the edible aqueous sol materials to be extruded through the nozzle. Examples of the additives are water-soluble vitamins such as ascorbic acid (vitamin C), pantothenic acid (vitamin M) and thiamine (vitamin $B_1$); mineral such as inorganic materials containing Fe, Ca etc.; amino acids such as alanine, methionine, aspartic acid, glutamine and arginine; nutrient fortifiers such as citric acid, malic acid and wheat germ and extract; flavoring agents or perfumes such as fish and shellfish extracts or flavors, seaweed extracts or flavors, and mushroom extracts or flavors; appetizers such as cycloheptadine hydrochloride; fish or animal attractants such as fish extracts, meat extracts and various hormones; seasonings such as HAP (hydrolyzed animal protein), HVP (hydrolyzed vegetable protein), sodium aspartate, alanine, glycine, sodium glutamate, arginine glutamate, lysine glutamate, sodium inosinate, sodium guanylate, sodium ribonucleotide, sodium chloride, soy sauce, sodium citrate, sodium tartrate and sodium malate; sweetenings such as fructose, sucrose, glucose, glucose syrup, sterioside, honey and maltose; and coloring agents such as carotenoid dyes (e.g., bixin and capsanthine), quinonic dyes (e.g., carminic acid), porphyrin type dyes such as chlorophikl, flavonoid dyes such as enocyanine and safflor yellow, and synthetic dyes such as amakanth, phloxine, and indigocarmine.

It is also possible to control the strength and texture of roe particles and particle formability by adding a chemical gelling agent to the edible aqueous sol materials.

The amounts of these additives are not critical. For example, the amounts are about 0.001 to about 5% by weight for the vitamines, minerals and fortifiers; about 0.001 to about 1% by weight for the flavoring agents or perfumes; about 0.001 to about 1% by weight for the appetizers; about 0.01 to about 1% by weight for the attractants; about 0.01 to about 20% by weight for the seasonings; about 0.001 to about 20% by weight for the sweetenings; and about 0.001 to about 10% by weight for the coloring agents, all based on the weight of the aqueous sol.

According to the process of this invention, as already described with reference to the accompanying drawings, at least two edible aqueous sol materials having different properties of being chemically gelled by a metal ion acceptable for human intake are synchronously discharged through different passages of a multi-tubular nozzle having at least two different passages including an inner passage and an outer passage surrounding the inner passage. Among the edible aqueous sol materials, a material forming the inner layer is convertible to a softer aqueous gel than a material forming the outer layer, or is present as an aqueous sol.

These materials may be released into the outer atmosphere so as to form aqueous sol droplets of a multilayer spherical structure. Or they may be released into a water-immiscible liquid (e.g., a liquid phase of an oily substance, the liquid phase being a stationary liquid phase, a vibrating liquid phase, or a fluidized liquid phase) so as to form aqueous sol droplets. Or these materials may be released onto or into a liquid phase containing an ion of a metal (preferably selected from Ca, Mg, Al, Fe and K) acceptable for human intake and capable of gelling at least the outermost layer of the aqueous sol droplets. According to the last-mentioned embodiment, the formation of the multilayer spherical structure by extruding the edible sol materials and the chemical gellation of at least the outermost layer of the resulting structure with the aforesaid metal ion can be performed by a one-step operation.

Discharging of these materials may be effected by allowing them to fall spontaneously, or by releasing them forcedly under pressure.

The multilayer spherical structure discharged in accordance with the process of this invention is gelled at least at its outermost layer with a metal ion acceptable for human intake. If desired, another chemical gelling agent may be used in combination. Examples of the other chemical gelling agent include sugars, sugar alcohols, organic acids, organic acid esters, and tannin. Specific examples of these gelling agents are glucose, galactose, xylose and saccharose as the sugars; sorbinol, mannitol and xylenol as the sugar alcohols; citric acid, oxalic acid, succinic acid, tartaric acid, lactic acid and glycidic acid as the organic acids; and methyl citrate, ethyl citrate and ethyl succinate as the organic acid esters.

Chemical gelling agents suitable for use in the process of this invention are organic or inorganic salts of polyvalent metals selected from Ca, Mg, Al, Fe and K. Specific examples of the salts are calcium acetate, calcium lactate, calcium chloride, magnesium chloride, barium chloride, aluminum chloride, iron chloride, potassium alum, potassium carbonate, potassium phosphate and tribasic potassium phosphate.

The concentration of the chemical gelling agent may be properly selected, and is preferably about 0.1 to about 50% by weight, more preferably about 0.1 to about 30% by weight, based on the weight of the aqueous solution of the gelling agent.

Preferably, the chemical gelling treatment is performed by dropping the discharged aqueous sol droplets in the ungelled state onto or into a stationary, vibrating or fluidized aqueous solution of the organic or inorganic salt of the polyvalent metal as the chemical gelling agent, because this procedure will give the desired product in one step. If desired, prior to the gelling treatment with the chemical gelling agent, the discharged aqueous sol droplets in the ungelled state may be subjected to a physical gelling means, for example by dropping them onto or into a cooled aqueous or oily liquid. Generally, the oily liquid is preferred for use in the physical gelling treatment because it can be used at a low temperature of 0° C. or less, and liquid droplets can be easily formed.

The conditions for the chemical gellation with the aforesaid metal ion may be properly chosen. In the production of a roe resembling a salmon roe, however, it is undesirable to treat the discharged sol droplets for too long a time with the solution of the chemical gelling agent in too high a concentration. One should be especially careful about this point when he has chosen a substance having a high degree of chemical gellability as a sol material in a layer to be occluded in order to secure water-holding property of the resulting product. When it is desired to obtain an artificial roe resembling dried herring roe, it is desirable to choose conditions which induce sufficient gellation of the discharged sol droplets which even reaches their inside. Generally, the temperature of the chemical gelling agent solution is about 0° C. to about 50° C., and the treating time is about 1 second to about 30 minutes.

In the performance of the process of this invention, the above-exemplified edible sol substances may be properly combined according to the gelling agent used. The selection can be easily determined experimentally depending upon the gelling agent used.

For example, when the metal ion used in gellation is a Ca ion, the outer layer of the discharged multilayer spherical structure is preferably formed of an edible aqueous sol material composed of at least one material gellable with a Ca ion selected from the group consisting of polysaccharides gellable with a Ca ion such as pectin, alginic acid and water-soluble salts of alginic acid, proteins gellable with a Ca ion such as wheat protein, soybean protein or zein, and poly(sodium acrylate), and the inner layer of the discharged structure is preferably formed of an edible aqueous sol material composed of at least one material difficulty-gellable or not gellable with a Ca ion selected from the group consisting of vegetable polysaccharides difficulty-gellable or not gellable with a Ca ion such as locust bean gum, agar, carregeenan, guaran and konjac flour, vegetable gums difficulty-gellable or not gellable with a Ca ion such as gum arabic, tragacanth gum, guar gum, xanthan gum and tamarind gum, starches difficulty-gellable or not gellable with a Ca ion such as kuzu starch, wheat starch, potato starch, dextrin, starch phosphate sodium salt and starch sodium glycolate, and protein materials difficulty-gellable or not gellable with a Ca ion as albumin, casein, gelatin and metaprotein.

When the metal ion used for gellation is a Mg ion, the outer layer of the discharged structure is preferably formed of an edible aqueous sol material composed of at least one material gellable with a Mg ion selected from the group consisting of vegetable polysaccharides gellable with a Mg ion such as pectin, proteins gellable with a Mg ion such as wheat protein, soybean protein and zein, and poly(sodium acrylate), and the inner layer of the discharged structure is preferably formed of an edible aqueous sol material composed of at least one material difficulty-gellable or not gellable with a Mg ion selected from the group consisting of vegetable gum difficulty-gellable or not gellable such as gum arabic, tragacanth gum, xanthan gum and tamarind gum, vegetable polysaccharides difficultly-gellable or not gellable with a Mg ion such as alginic acid, water-soluble salts of alginic acid, locust bean gum, agar, carrageenan, guaran and konjac flour, starches difficultly-gellable or not gellable with a Mg ion such as kuzu starch, wheat starch, potato starch, dextrin, starch phosphate sodium salt and starch sodium glycolate, and proteins difficulty-gellable or not gellable with a Mg ion such as albumin, casein, gelatin and metaprotein.

When the metallic ion used for gellation is an Al ion, the outer layer of the discharged structure is preferably formed of an edible aqueous sol material composed of at least one material gellable with an Al ion selected from the group consisting of vegetable polysaccharides gellable with an Al ion such as pectin, alginic acid, water-soluble salts of alginic acid and carrageenan, vegetable gums gellable with an Al ion such as gum arabic, tragacanth gum and xanthan gum, proteins gellable with an Al ion such as zein, casein and albumin, cellulosic materials gellable with an Al ion such as cellulose sodium glycolate, starches gellable with an Al ion such as starch sodium glycolate and starch phosphate sodium salt, and poly (sodium acrylate), and the inner layer is preferably formed of an edible aqueous sol material composed of at least one material difficultly-gellable or not gellable with an Al ion selected from the group consisting of vegetable polysaccharides difficultly-gellable or not gellable with an Al ion such as locust bean gum, konjac flour, agar and propylene glycol alginate, vegetable gums difficultly-gellable or not gellable with an Al ion such as tamarind gum and guar gum, starches difficultly gellable or not gellable with an Al ion such as kuzu starch, wheat starch and dextrin, proteins difficultly-gellable or not gellable with an Al ion such as wheat protein, soybean protein, gelatin and metaprotein, and cellulosic materials difficultly-gellable or not gellable with an Al ion such as methyl cellulose.

When the metal ion used for gelation is an Fe ion, the outer layer of the discharged structure is preferably formed of an edible water-soluble sol material composed of at least one material gellable with an Fe ion selected from the group consisting of vegetable polysaccharides gellable with an Fe ion such as pectin, alginic acid, water-soluble salts of alginic acid, carrageenan and xanthan gum, proteins gellable with an Fe ion such as wheat protein soybean protein and zein, starches gellable with an Fe ion such as starch phosphate sodium salt and starch sodium glycolate, and poly(sodium acrylate), and the inner layer of the discharged structure is preferably formed of an edible aqueous sol material composed of at least one material difficultly-gellable or not gellable with an Fe ion selected from the group consisting of vegetable gums difficultly-gellable or not gellable with an Fe ion such as gum arabic, tragacanth gum and locust beangum, vegetable polysaccharides difficultly-gellable or not gellable with an Fe ion such as agar, starches difficultly-gellable or not gellable with an Fe ion such as kuzu starch, wheat starch and dextrin, and proteins difficultly-gellable or not gellable with an Fe ion such as casein and gelatin.

When the metal ion used in gellation is a K ion, the outer layer of the discharged structure is preferably formed of an edible aqueous sol material composed of at least one material gellable with a K ion selected from the group consisting of vegetable polysaccharides gellable with a K ion as pectin and carrageenan, vegetable gums gellable with a K ion, proteins gellable with a K ion and methyl cellulose, and the inner layer of the discharged structure is preferably formed of an edible aqueous sol material composed of at least one material difficultly-gellable or not gellable with a K ion selected from the group consisting of vegetable gums difficultly-gellable or not gellable with a K ion, vegetable polysaccharides difficultly-gellable or not gellable with a K ion, starches difficultly-gellable or not gellable with a K ion, proteins difficultly-gellable or not gellable with a K ion, and methyl cellulose.

The degree to which the edible aqueous sol materials are gellable or not gellable varies depending upon the type of the metal ion. Furthermore, these edible aqueous sol materials can be used not only singly but also in combination with each other. Accordingly, the tendency and degree of gelation of the edible aqueous sol materials should be first determined experimentally according to the type of the metal ion used, and the types of the sol materials, and then the edible aqueous sol material combination should be selected so that a material forming the inner layer is convertible to a softer aqueous gel than a material forming an outer layer or is present as an aqueous sol even after the gellation treatment. The tendency and degree of gelation can be easily determined experimentally. In the case of using another chemical gelling agent, too, they can be easily determined experimentally.

In the process of this invention, an oily substance can be discharged through at least one passage of the multitubular nozzle other than the passage through which the aqueous sol material forming the outermost layer of the multilayer spherical structure is discharged. Examples of the oily substance that can be advantageously used include vegetable oils and fats such as olive oil, safflower oil, corn oil, sunflower oil, cotton seed oil, camellia oil, rice bran oil and mixtures thereof, and animal oils and fats, for example, fish oils such as cuttlefish oil and cod oil, fish liver oils such as shark liver oil, carp liver oil and cod liver oil, sea animal oils such as seal oil and blue whale oil, shellfish oils such as abalone oil and oyster oil, and mixtures of these. Oily substances which can be used as pharmaceutical ingredients, such as castor oil, fatty acid glycerides and vitamin E, can also be used. If desired, these oily substances may be incorporated with the same additives as described hereinabove with regard to the edible aqueous sol materials. The amounts of such additives are the same as hereinabove exemplified.

When it is desired to obtain an artificial roe closely resembling a salmon roe, it is desirable to increase the color density of the aforesaid oily substance over that of the aqueous sol so that the "yolk" portion of natural salmon roe is well simulated in the resulting product. For example, particles obtained by the process of this invention from an oily substance colored to orange red with a commercially available oil-soluble natural food dye and an aqueous sol materials colored to pale yellowish orange with a commercially available natural water-soluble food dye are very similar to natural salmom roe. If the aqueous sol materials are transparent, the product is more like the salmon roe.

The edible roe-like multilayer spherical structure produced by the process of this invention may be eaten by man as such or as a mixture with natural fish and shellfish, natural roes, or other foods. Furthermore, the resulting artificial roe may be a bait for fishing or as a feed for cultivated fishes or domestic animals and poultry. According to the purposes of use, the outermost layer of the product may be processed suitably, for example by coating it with an edible tacky material to give suitable tackiness, seasoning, or color. If further required, a preservative, such as a spray of alcohol, may be added for increasing storage stability, or heat sterilization may be applied.

The artificial roes obtained by the process of this invention may be bottled, or packed in plastic containers. Plastic packs are preferably sealed up with an aluminum closure having a plastic film laminated thereto. The product may be stored in a substantially oxygen-free atmosphere (for example, using a deoxygenating agent, $N_2$ gas, $CO_2$ gas, etc.).

In the structure of this invention, two more sol or gel layers to be occluded may be present, and two or more covering layers including the outermost layer may be present.

In combination with the chemical gellation, physical gellation such as drying may be performed. However, if only the physical gellation is performed without the chemical gellation, a satisfactory covering layer cannot be obtained. Or when the resulting multilayer structure is dried to a great extent, the inner layer occluded also dries up, so that a product similar to roe cannot be obtained.

The following Examples illustrate the present invention more specifically. It should be understood that these examples are in no way limitative.

EXAMPLE 1

A triple-tubular nozzle of the type shown in FIG. 4 composed of a nozzle having an inside diameter of 1 mm, a nozzle having an inside diameter of 5 mm and a nozzle having an inside diameter of 8.5 mm was used. A salad oil, a sol containing 4% of gelatin as an occluding layer, and a sol containing 0.8% of sodium alginate as a covering layer were discharged synchronously through the nozzle having an inside diameter of 1 mm, the nozzle having an inside diameter of 5 mm and the nozzle having an inside diameter of 8.5 mm, respectively, to form sol droplets. The sol droplets were dropped into a 3% aqueous solution of calcium chloride kept at 15° C., and chemically gelled for 30 seconds. The particulate product was taken out, and lightly washed with water. Thus, an artificial roe of good quality composed of an oily material, an aqueous sol layer and a covering gel layer could be obtained by one particle-forming operation. The covering layer of the artificial roe was uniform, and no portion of the covering layer was too thick or was broken.

For comparison, in the above procedure, the sol droplets as discharged were dropped into an edible oil at 0° C., separated, and gelled by drying at a low temperature. The product was like dry grapes and showed a shape and a touch different from those of an artificial roe.

EXAMPLE 2

A four-member nozzle unit composed of four concentrically arranged nozzles having an inside diameter of 1 mm, 5 mm, 7.5 mm and 9.5 mm, respectively, was used. A salad oil containing a commercially available fish flavor (salmon oil) and colored to orange red with a commercially available oily natural food dye, a sol containing 5% of gelatin and 0.3% of guar gum and colored to pale yellow orange with a commercially available aqueous natural food dye, a sol containing 5% of gelatin, 1% of pectin and 0.5% of calcium lactate, and a sol containing 1% of sodium alginate were synchronously discharged through the nozzles having an inside diameter of 1 mm, 5 mm, 7.5 mm, and 9.5 mm, respectively, to form sol droplets. The sol droplets were dropped into a 3% aqueous solution of calcium lactate kept at 10° C., and chemically gelled for 3 minutes. The particulate product was taken out, and lightly washed with water. An artificial roe composed of an oily material, an aqueous sol layer, a soft aqueous gel layer and a hard covering gel layer could be obtained.

The artificial roe was very similar to a salted salmon roe and had superior strength, shape, retention, water-holding property, palatability, color and smell.

For comparison, in the above procedure, the sol droplets were physically gelled by drying at a low temperature instead of chemically gelling them. In order to prevent them from looking like dry grapes, the drying was stopped when the surface of the sol droplets was gelled. Particles were obtained, but had poor water-holding property and shape retention so that on standing at room temperature for about 1 hour, they got out of shape. The product was not practical as an artificial roe.

EXAMPLE 3

The same procedure as in Example 2 was repeated except that a sol containing 5% of gelatin was used instead of the sol containing 5% of gelatin and 0.3% of guar gum, a sol containing 3% of pectin and 0.3% of sodium alginate was used instead of the sol containing 5% of gelatin and 1% of pectin, and the chemical gellation was performed for 7 minutes. The resulting product was an artificial roe composed of an oily material, an aqueous sol layer, a slightly weak gel covering layer and a strong gel covering layer. It was very similar to a salted salmon roe and had superior strength, shape retention, palatability, color and smell.

EXAMPLE 4

A five-member nozzle unit composed of five concentrically arranged nozzles having an inside diameter of 1 mm, 5 mm, 7.5 mm, 9.5 mm and 11.5 mm respectively was used. A salad oil containing a commercially available fish flavor (salmon oil) and colored to orange red with a commercially available oily natural food dye, a sol containing 10% of gum arabic colored to orange red with a commercially available aqueous natural food dye, a sol containing 5% of zein, a sol containing 3% of pectin and 0.2% of sodium alginate, and a sol containing 0.8% of sodium alginate were synchronously discharged through these nozzles having an inside diameter of 1 mm, 5 mm, 7.5 mm, 9.5 mm, and 11.5 mm, respectively, to form sol droplets. The sol droplets were dropped into a 5% aqueous solution of calcium lactate kept at 15° C., and allowed to stand for 6 minutes to gel them chemically. The particulate product was taken out and lightly washed with water.

The particulate product was an artificial roe of a five-layer structure composed of an oily material, an aqueous sol layer, a weak aqueous gel layer, a covering gel layer, and a strong covering gel layer. It was very similar to a salted salmon roe and had superior strength, shape retention, water-holding property, palate, color and smell.

EXAMPLE 5

Figure 1A:
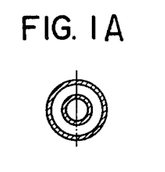
Figure 1B:
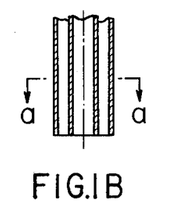
Figure 2A:
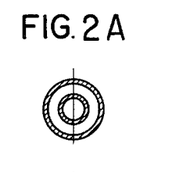
Figure 2B:
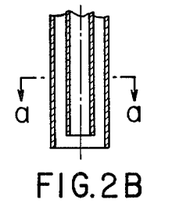
Figure 3A:
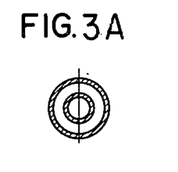
Figure 3B:
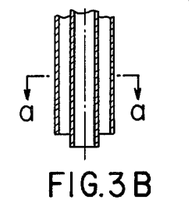

A double-tubular nozzle of the type shown in FIG. 1(A) composed of a nozzle having an inside diameter of 1.5 mm and a nozzle having an inside diameter of 2.5 mm was used. A sol containing 7% of gelatin and colored to light black with a natural dye, and a sol containing 1% of sodium alginate were synchronously discharged through these nozzles having an inside diameter of 1.5 mm and 2.5 mm, respectively, to form sol droplets. The sol droplets were dropped into a 3% aqueous solution of calcium chloride kept at 20° C. and chemically gelled for 30 seconds. The particulate product was taken out and lightly washed with water.

The resulting granular product was an artificial roe composed of an aqueous sol layer and a covering gel layer. It was very similar to caviar and had superior strength, shape retention, water-holding property and color.

EXAMPLE 6

A four-member nozzle unit composed of 4 concentrically arranged nozzles having an inside diameter of 1 mm, 5 mm, 7.5 mm and 9.5 mm was used. A salad oil containing a commercially available fish flavor (salmon oil) and colored with a commercially available oily natural food dye, a sol containing 5% of gelatin and 0.3% of guar gum and colored to pale yellow orange with a commercially available natural food dye, a sol containing 5% of gelatin and 1% of pectin, and a sol containing 1% of sodium alginate were synchronously discharged into a flow of corn oil kept at 2° C. to form sol droplets of a four-layer structure, and allowed to stay in this flow for 30 seconds to cool and gel them. The particulate product was then separated from the corn oil. The oil adhering to the surface of the resulting particulate product was removed, and the product was dipped in a 3% aqueous solution of calcium lactate kept at 15° C. and allowed to stand for 3 minutes in it to gel it chemically. The particulate product was taken out and lightly washed with water.

The resulting particulate product was an artificial roe very similar to a salted salmon roe and had superior strength, shape retention, palatability, color, smell and water-holding property.

EXAMPLE 7

A triple-tubular nozzle of the type shown in FIG. 4 composed of three nozzles having an inside diameter of 1.5 mm, 6.0 mm and 8.0 mm, respectively was used. A salad oil containing a commercially available fish flavor (salmon oil) and vitamin E and colored to orange red with an oily natural food dye, a sol containing 0.8% of locust bean gum and colored to pale yellow orange with an aqueous natural food dye, and a sol containing 1.8% of sodium alginate were synchronously discharged through these nozzles having an inside diameter of 1.5 mm, 6.0 mm and 8.0 mm, respectively, to form sol droplets. The sol droplets were dropped into a 10% aqueous solution of calcium chloride kept at 7° C., and chemically gelled for 10 seconds. The particulate product was taken out, and lightly washed with water. There was obtained an artificial roe very similar to a salted salmon roe and composed of an oily material, an aqueous sol layer and a covering gel layer. The texture, palatability, water-holding property, shape retention, appearance, strength and color stability of the resulting artificial roe were very much like those of natural salted salmon roe on the market.

EXAMPLE 8

A triple-tubular nozzle of the type shown in FIG. 4 composed of three nozzles having an inside diameter of 1.0 mm, 5.0 mm and 8.5 mm was used. A salad oil containing a commercially available fish flavor (salmon oil) and colored to orange red with a commercially available oily natural food dye, a sol containing 5% of gelatin, and a flowable sol containing 5% of gelatin and 1% of carrrageenan and colored to pale yellow orange with a commercially available aqueous natural food dye, and a sol containing 1.8% of sodium alginate were synchronously discharged through these nozzles having an inside diameter of 1.0 mm, 5.0 mm and 8.5 mm respectively into the atmosphere to form particles. The particles were dropped into a 10% aqueous solution of calcium chloride kept at 5° C., and allowed to stand for 30 seconds in it to gel them chemically. The gelled particles were taken out and lightly washed with water. The resulting particles were an artificial roe which was very similar to a salted salmon roe in regard to shape retention, water-holding property, texture, color and smell.

The covering layer of the resulting artificial roe had a water content of 93.0%.

EXAMPLE 9

A double-tubular nozzle of the type shown in FIG. 1 composed of two nozzles having an inside diameter of 4 mm and 8 mm respectively was used. A sol containing 7% of gelatin as an inner layer and a sol containing 0.8% of sodium alginate as an outer layer were synchronously discharged through the nozzles having an inside diameter of 4 mm and 8 mm respectively to form sol droplets. The sol droplets were dropped into a 3% aqueous solution of calcium chloride kept at 5° C. The resulting product was lightly washed with water to form an artificial roe having gelatin in the inner layer and sodium alginate in the outer layer by one operation.

EXAMPLE 10

An artificial roe was produced by the same operation as in Example 9 except that a solution containing 7% of gelatin and 1.0% of calcium chloride was used instead of 7% of gelatin.

EXAMPLE 11

The procedure of Example 9 was repeated except that 3% of pectin was used instead of 7% of gelatin. An artificial roe of a two-layer structure having pectin in an inner layer and sodium alginate in an outer layer could be obtained by one operation.

EXAMPLE 12

The same procedure as in Example 11 was repeated except that a solution containing 3% of pectin and 0.4% of calcium lactate was used instead of 3% of pectin. An artificial roe having a two-layer structure was obtained.

EXAMPLE 13

The same procedure as in Example 9 was repeated except that a solution containing 5% of gelatin, 0.3% of sodium alginate and 0.4% of calcium lactate was used instead of 7% of gelatin, and a solution containing 5% of gelatin and 0.8% of sodium alginate was used instead of 0.8% of sodium alginate. An artificial roe having a two-layer structure could be obtained by one particle-forming operation.

EXAMPLE 14

A triple-tubular nozzle composed of three nozzles having an inside diameter of 1.0 mm, 5 mm and 8.5 mm respectively was used. A salad oil, a sol containing 5% of gelatin and 2% of pectin, and a sol containing 0.8% of sodium alginate were synchronously discharged through these nozzles having an inside diameter of 1.0 mm, 5 mm, and 8.5 mm, respectively, to form sol droplets. The sol droplets were dropped into a 3% aqueous solution of calcium lactate kept at 5° C. The particulate product was taken out and lightly washed with water. By one particle-forming operation, an artificial roe of a three-layer structure containing salad oil in the center could be obtained.

EXAMPLE 15

By using a triple-tubular nozzle of the type shown in FIG. 1(D) composed of three nozzles having an inside diameter of 1 mm, 5 mm and 8.5 mm respectively, sol droplets of a three-layer structure were prepared in which a salad oil containing a commercially available fish flavor (salmon oil) and colored to orange red with a commercially available oil natural food dye was occluded by a first sol layer derived from an aqueous solution containing 5% of gelatin, 2% of pectin and 0.3% of sodium alginate and colored to pale yellow orange with a commercially available water-soluble natural food dye, and the first sol layer was occluded by a second sol layer containing 5% of gelatin and 0.8% of sodium alginate. The sol droplets were dropped into a 3% aqueous solution of calcium lactate kept at 5° C.

The particulate product was taken out and lightly washed with water. Thus, an artificial roe having a three-layer structure containing the salad oil could be obtained by one operation.

The resulting artificial roe was very much like a salted salmon roe and had superior strength, shape retention, color, smell and texture.

EXAMPLE 16

The same procedure as in Example 9 was repeated except that 3% of pectin was used instead of 7% of gelatin and a 1% aqueous solution of potassium carbonate was used instead of the 3% aqueous solution of calcium chloride. An artificial roe having a two-layer structure composed of an inner layer of pectin and an outer layer of sodium alginate could be obtained by one operation. The product was of very good quality as in Example 9.

What we claim is:

1. In a process for producing an edible roe-like multilayer spherical structure composed of at least two layers including an inner layer and an outer layer occluding the inner layer, which comprises synchronously discharging at least two edible materials through a multi-tubular nozzle having at least two different passages including an inner passage and an outer passage surrounding the inner passage and subjecting the resulting multilayer spherical structure to chemical gelling treatment with a metal ion acceptable for human intake, the outer layer in said resulting multilayer spherical structure being chemically gelable with said metal ion; the improvement wherein
    (i) said at least two edible materials are at least two edible aqueous sol materials having different properties of being chemically gelled with a Ca ion, and
    (ii) among said edible aqueous sol materials, the material forming the inner layer is a material which is convertible to a softer aqueous gel than the material forming the outer layer upon chemical gelling and selected from the group consisting of locust bean gum, agar, carrageenan, guaran, konjac flower, gum arabic, tragacanth gum, guar gum, xanthan gum, tamarind gum, kuzu starch, wheat starch, potato starch, dextrin, a starch phosphate sodium salt, starch sodium glycolate, albumin, casein, gelatin and a metaprotein, and the material forming the outer layer is selected from the group consisting of pectin, alginic acid, a water-soluble salt of alginic acid, wheat protein, soybean protein, zein and poly sodium acrylate.

2. In a process for producing an edible roe-like multilayer spherical structure composed of at least two layers including an inner layer and an outer layer occluding the inner layer, which comprises synchronously discharging at least two edible materials through a multi-tubular nozzle having at least two different passages including an inner passage and an outer passage surrounding the inner passage and subjecting the resulting multilayer spherical structure to chemical gelling treatment with a metal ion acceptable for human intake, the outer layer in said resulting multilayer spherical structure being chemically gelable with said metal ion; the improvement wherein
    (i) said at least two edible materials are at least two edible aqueous sol materials having different properties of being chemically gelled with a Mg ion, and
    (ii) among said edible aqueous sol materials, the material forming the inner layer is a material which is convertible to a softer aqueous gel than the material forming the outer layer upon chemical gelling, and selected from the group consisting of gum arabic, tragacanth gum, xanthan gum, tamarind gum, alginic acid, a water-soluble salt of alginic acid, locust bean gum, agar, carrageenan, guaran, konjac flower, kuzu starch, wheat starch, potato starch, dextrin, starch phosphate sodium salt, starch sodium glycolate, albumin, casein, gelatin and metaprotein and the material forming the outer layer is selected from the group consisting of pectin, wheat protein, soybean protein, zein and poly sodium acrylate.

3. In a process for producing an edible roe-like multilayer spherical structure composed of at least two layers including an inner layer and an outer layer occluding the inner layer, which comprises synchronously discharging at least edible materials through a multi-tubular nozzle having at least two different passages including an inner passage and an outer passage surrounding the inner passage and subjecting the resulting multilayer spherical structure to chemical gelling treatment with a metal ion acceptable for human intake, the outer layer in said resulting multilayer spherical structure being chemically gelable with said metal ion; the improvement wherein
    (i) said at least two edible materials are at least two edible aqueous sol materials having different properties of being chemically gelled with an Al ion, and
    (ii) among said edible aqueous sol materials, the material forming the inner layer is a material which is convertible to a softer aqueous gel than the material forming the outer layer upon chemical gelling, and selected from the group consisting of locust bean gum, konjac flower, agar, a propylene glycol alginate, tamarind gum, guar gum, kuzu starch, wheat starch, dextrin, wheat protein, soybean protein, gelatin, metaprotein and methyl cellulose, and the material forming the outer layer is selected from the group consisting of pectin, alginic acid, a water-soluble salt of alginic acid, carrageenan, gum arabic, tragacanth gum, xanthan gum, casein, albumin, a cellulose sodium glycolate, starch sodium glycolate, starch phosphate sodium salt and poly sodium acrylate.

4. In a process for producing an edible roe-like multilayer spherical structure composed of at least two layers including an inner layer and an outer layer occluding the inner layer, which comprises synchronously discharging at least two edible materials through a multi-tubular nozzle having at least two different passages including an inner passage and an outer passage surrounding the inner passage and subjecting the resulting multilayer spherical structure to chemically gelling treatment with a metal ion acceptable for human intake, the outer layer in said resulting multilayer spherical structure being chemically gelable with said metal ion; the improvement wherein
    (i) said at least two edible materials are at least two edible aqueous sol materials having different properties of being chemically gelled with a Fe ion, and
    (ii) among said edible aqueous sol materials, the material forming the inner layer is a material which is convertible to a softer aqueous gel than the material forming the outer layer upon chemical gelling, and selected from the group consisting of gum arabic, tragacanth gum, locust bean gum, agar, kuzu starch, wheat starch, dextrin, casein and gelatin, and the material forming the outer layer is selected from the group consisting of pectin, alginic acid, a water-soluble salt of alginic acid, carrageenan, xanthan gum, zein, starch phosphate sodium salt, starch sodium glycolate and poly sodium acrylate.

* * * * *

UNITED STATES PATENT AND TRADEMARK OFFICE
CERTIFICATE OF CORRECTION

PATENT NO. : 4,375,481
DATED : March 1, 1983
INVENTOR(S) : Kiyoaki KUWABARA and Masanori JYOURAKU It is certified that error appears in the above—identified patent and that said Letters Patent is hereby corrected as shown below:

Claim 3, line 5 thereof, correct to read:

-- charging at least two edible materials through a multi-tubu- --.

Signed and Sealed this

Twenty-ninth Day of May 1984

[SEAL]

Attest:

GERALD J. MOSSINGHOFF

Attesting Officer

Commissioner of Patents and Trademarks